United States Patent [19]

Garrison, deceased et al.

[11] 4,175,905
[45] Nov. 27, 1979

[54] BOAT LOADER

[76] Inventors: Ray L. Garrison, deceased, late of Klamath Falls, Oreg.; R. Leonard Garrison, Jr., 300 Summit, San Rafael, Calif. 94902

[21] Appl. No.: 12,823

[22] Filed: Feb. 16, 1979

[51] Int. Cl.² ............................................. B60R 9/00
[52] U.S. Cl. .................................... 414/462; 414/529
[58] Field of Search ............. 414/462, 529, 538, 549; 224/310

[56] References Cited

U.S. PATENT DOCUMENTS

| | | | |
|---|---|---|---|
| 2,584,163 | 2/1952 | Squires | 414/462 |
| 2,722,326 | 11/1955 | Conroy | 414/462 |
| 2,753,063 | 7/1956 | Abel | 414/462 |
| 2,985,327 | 5/1961 | Gilkison | 414/462 |
| 3,435,970 | 4/1969 | Sutton | 414/462 |
| 3,612,314 | 10/1971 | Cooper | 414/462 |
| 3,716,156 | 2/1973 | Risney | 414/462 |
| 3,777,922 | 12/1973 | Kirchmeyer | 414/462 |
| 3,930,584 | 1/1976 | Davis | 414/462 |
| 3,954,199 | 5/1976 | Grove | 414/462 |
| 3,999,673 | 12/1976 | Anderson | 414/462 |
| 4,024,971 | 5/1977 | Rohrer | 414/462 |
| 4,087,014 | 5/1978 | Schadle | 414/462 |

OTHER PUBLICATIONS

"Eide Automatic Boat Loaders", Recreation Industries Company, Oswego, Oregon (date of publication is unknown but believed to be 1975).

Primary Examiner—Trygve M. Blix
Assistant Examiner—George F. Abraham
Attorney, Agent, or Firm—David L. Garrison

[57] ABSTRACT

A simplified loading mechanism for placing small boats onto a framework including front and rear roller means, the framework being attached to the upper surface of a vehicle, is described. The rear roller acts as a winch mechanism and line storage for a pair of parallel running lines extending forwardly about the lower surface of the front roller and then running rearwardly over the top of the front roller and top of the rear roller to a straddle or bail for attachment to the gunwales of a small boat. The front and rear straddle lines are attached at spaced-apart locations upon the gunwales of the boat at a location whereby the run of the rearward straddle line will engage the rear roller when the boat is tilted upwardly with the transom thereof resting on the ground behind the vehicle and the bow of the boat pointed upwardly. Continued running in of the running lines causes the rear straddle line to bend about the rear roller thereby initiating upward movement of the boat at substantial mechanical advantage while urging the rotation thereof into a position wherein the boat lies flat and upside down upon the front and rear rollers.

9 Claims, 8 Drawing Figures

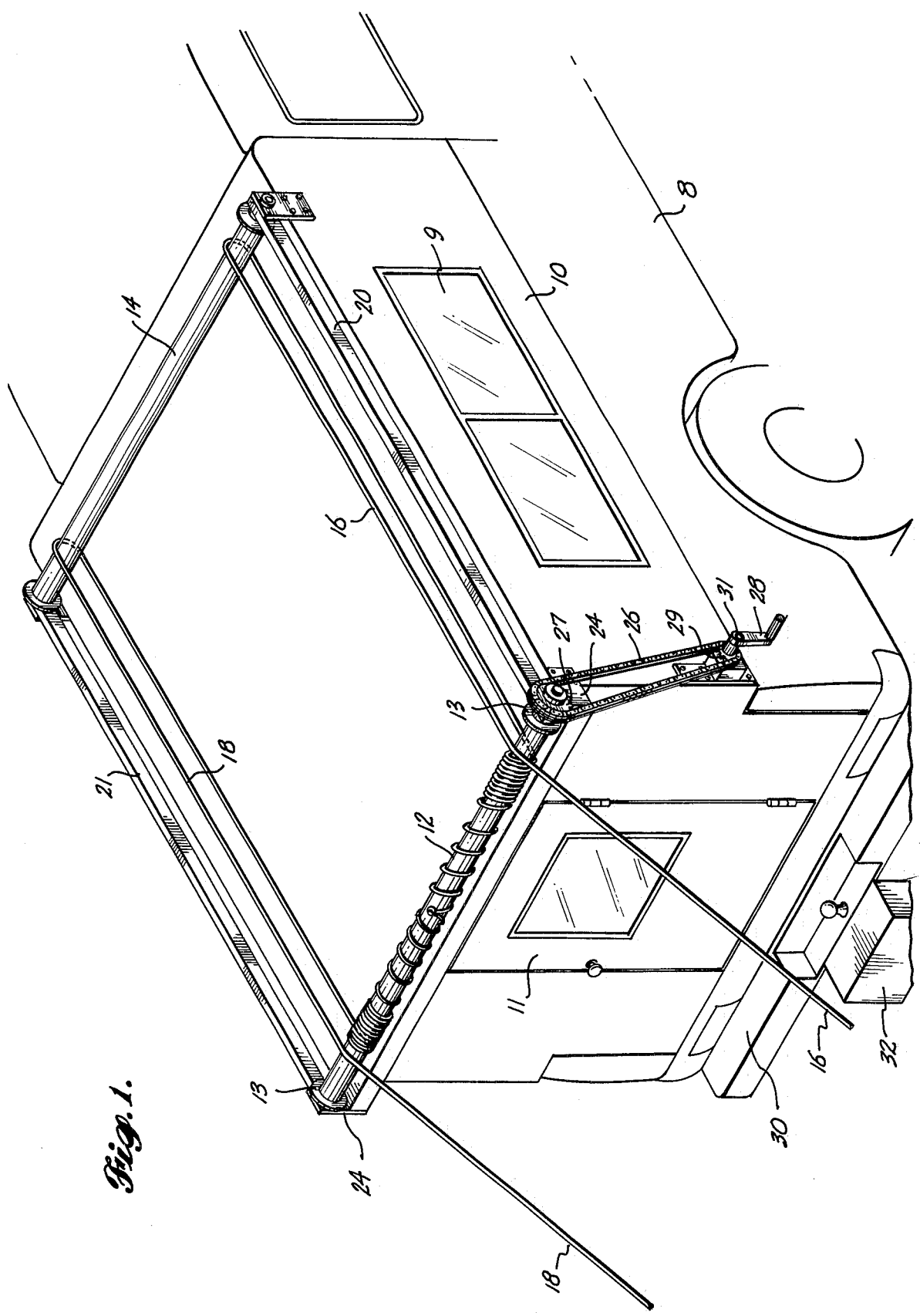

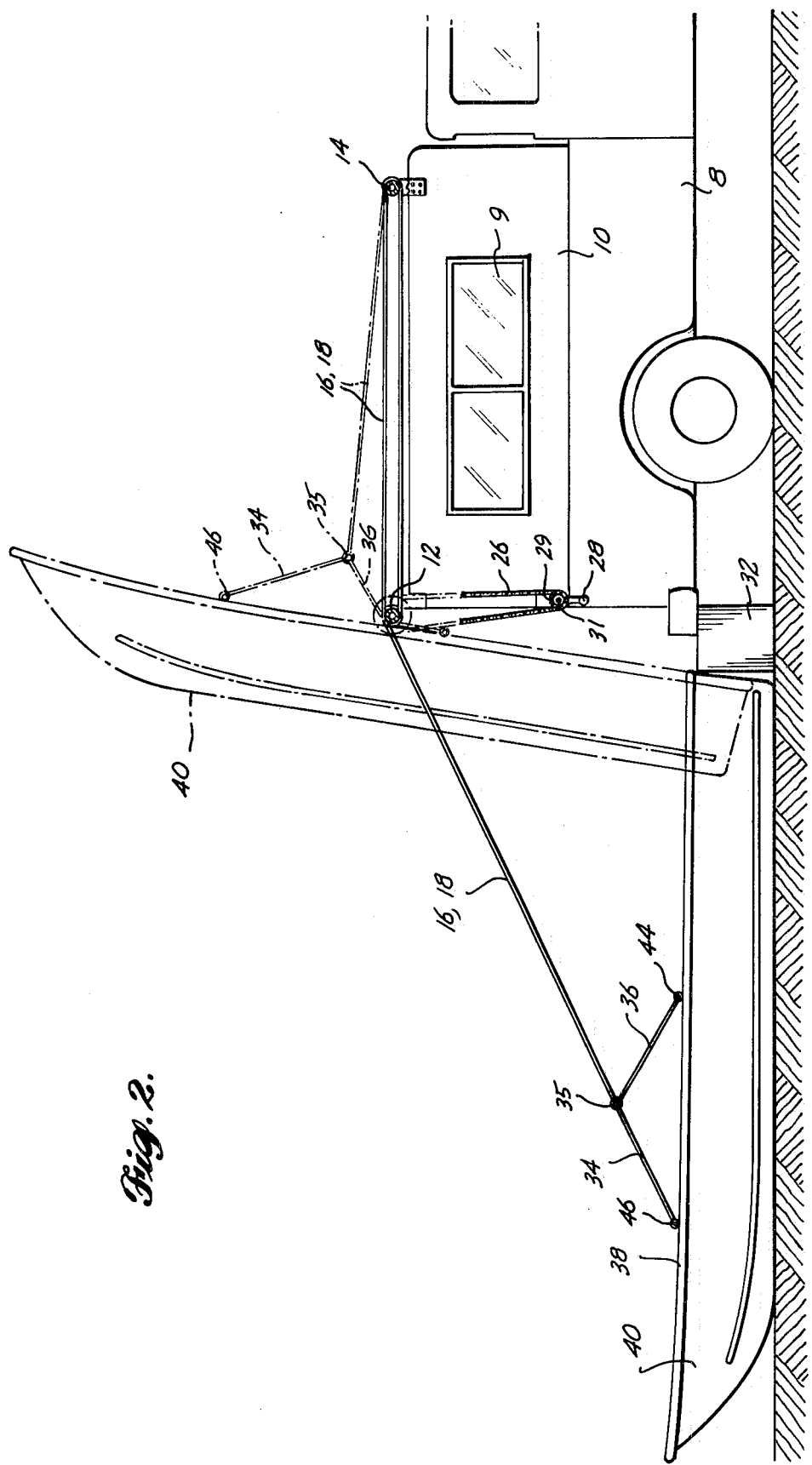

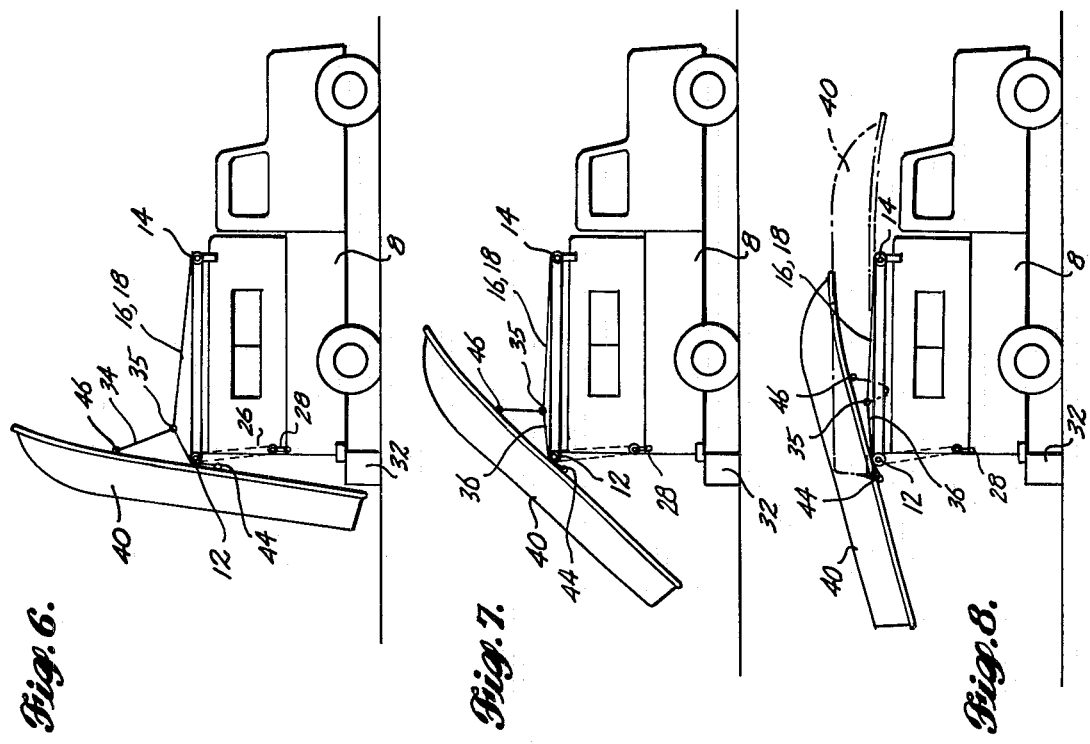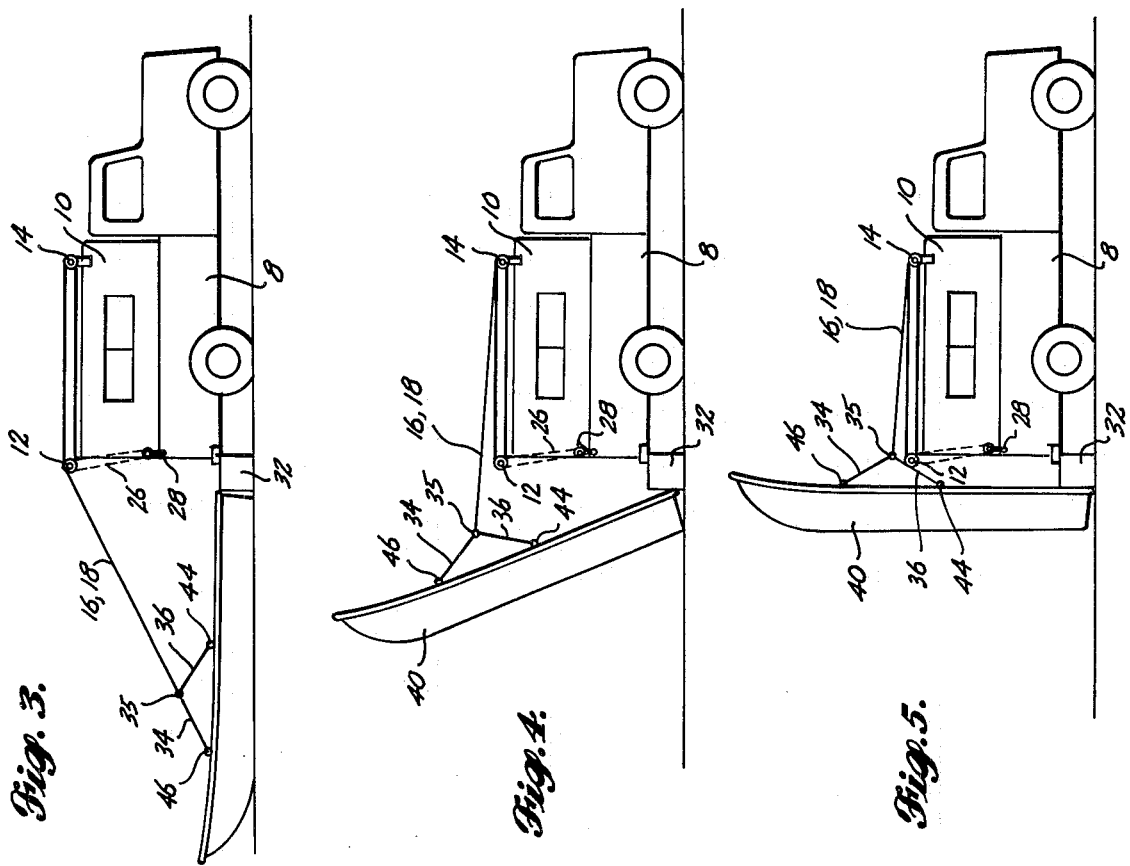

BOAT LOADER

BACKGROUND OF THE INVENTION

This invention relates to the field of devices useful for loading and unloading a boat on an associated vehicle with dispatch and a minimum of effort.

Numerous devices have been heretofor designed for the purpose of loading a boat onto the top of a vehicle and unloading a boat from the top of a vehicle to minimize the strenuous lifting exercises otherwise necessary to place the boat into a position for transportation on the vehicle. Usually, elongated support arm structures pivotally mounted on the vehicle are necessary for operation of such devices. Examples of prior structures may be found in the following United States Patents: U.S. Pat. No. 2,584,163 to Squires; U.S. Pat. No. 2,722,326 to Conroy; U.S. Pat. No. 2,753,063 to Able; U.S. Pat. No. 2,985,327 to Gilkison; U.S. Pat. No. 3,435,970 to Sutten; U.S. Pat. No. 3,612,314 to Cooper; U.S. Pat. No. 3,716,156 to Risney; U.S. Pat. No. 3,777,922 to Kirchmeyer; U.S. Pat. No. 3,930,584 to Davis; and U.S. Pat. No. 4,024,971 to Rohrer. While each of these previous devices are fully capable of assisting a boat onto the top of a vehicle and unloading a boat from the top of a vehicle, various types of support arms and complicated rigging are required for operation of the device. In addition, some of the devices are so constructed as to place undue stresses upon the boat being loaded or unloaded from the associated vehicle. Certain of the prior art devices either require the assistance of at least one person in addition to the primary operator to effect the loading and unloading process or, in the absence of the second operator can permit the boat to assume a skewed position on the vehicle during loading and/or unloading thus restricting the benefits of such loaders.

The devices shown in the Risney, Cooper and Kirchmeyer patents include an unwieldy and complicated mechanical linkage, some including spring tensioning devices, to assist in loading and unloading the boat.

The invention described herein eliminates the need for pivotally mounted lifting arms and other types of complicated mechanical linkages and elongated movable support mechanisms. The elimination of such devices permits loading and unloading of the boat with a minimum horizontal rearward clearance behind the vehicle substantially equivalent to the length of the boat and with side clearance no greater than that necessary for normal operation of the vehicle. This invention further provides multiple lift locations for attachment to the boat whereby undue stresses during the loading and unloading process are minimized to prevent damage to the boat.

SUMMARY

The loading and unloading mechanism taught herein comprises a framework adapted for attachment to the top of an automotive vehicle or other vehicle wherein the framework rigidly engages the vehicle and provides for mounting of at least two boat support elements positioned transversely with respect to the path of travel of the vehicle. One of the supports is a rotatively mounted roller means positioned near one end of the framework. The roller means carries a pair of running lines bent about the roller whereby the roller functions as a winch device as well as a roller support for the boat. The pair of running lines are positioned one toward each outer end of the roller and pass in parallel fashion toward and around a second support element, which may advantageously be a roller mounted for rotation in the framework positioned substantially parallel to the first mentioned roller. The running lines, remaining substantially parallel and spaced apart a distance approximately the gunwale width of a small boat pass rearwardly over the top of the first mentioned roller, thence downwardly to a point of lifting engagement with a lift eye or other connection means provided for each running line. A pair of straddle or bail lines depend from each lift eye and have terminal ends thereof attached at spaced apart locations on or adjacent the gunwales of the boat, the rearward location for mounting on each gunwale being located a distance forward of the transom which is less than the height of the first mentioned roller above the ground level. The second, forwardly positioned mounting locations are positioned a distance on or adjacent the gunwale forward of the rearwardly positioned locations a distance whereby said lifting eye is above the first mentioned roller when the boat is bow up and vertically positioned adjacent the first mentioned roller. Boats of various lengths may readily be loaded by the loader mechanism so long as the gunwale mount locations are positioned as described.

Accordingly, it is an object of this invention to provide a boat loading and unloading mehanism, for use with an associated vehicle, specifically designed for raising and lowering a boat to and from the top of the associated vehicle with a minimum of effort by a single operator.

Another object of this invention is to provide a loading mechanism, adapted to load and unload a small boat upon a vehicle wherein a substantial mechanical advantage in lift is achieved at the orientation of the boat requiring the greatest vertical lifting force.

An additional object of this invention is to provide a loader for small boats wherein the boat being loaded is controlled throughout the loading and unloading process by a pair of parallel running lines under tension so that sudden movements of the boat potentially resulting in injury or damage to the boat are avoided.

It is a further object of this invention to provide a lift mechanism for loading and unloading a boat having a plurality of boat engaging locations whereby undue stresses on the boat structure during loading and unloading are minimized.

An additional object of this invention is to provide a simplified boat loading and unloading mechanism which has a pair of elongated lines as the sole lifting and handling means for the boat which loads and unloads the boat easily without permitting excessive skewing movement of the boat during loading and unloading process.

A further additional object is to provide a boat loader having a minimum of moving parts and mechanical linkages.

It is a still further object of this invention to provide a boat loading and unloading mechanism which may be utilized with boats of varying dimensions and with automotive vehicles of different types and sizes.

BRIEF DESCRIPTION OF DRAWINGS

FIG. 1 is a perspective view of a portion of the apparatus of this invention shown from a position above and to the rear of the vehicle.

FIG. 2 is a side elevational view of the boat loader and unloader of this invention showing the boat positioned on the ground with its transom rearwardly adjacent the back of the vehicle and showing the boat in outline at a partially elevated position for loading.

FIGS. 3 through 8 show various side elevational views demonstrating the loading and unloading sequences and positions of the boat at various stages in the process of loading and unloading.

DETAILED DESCRIPTION OF THE INVENTION

Referring now more specifically to the drawings, wherein like figures indicate like parts, there is shown a conventional vehicle 8 of the pick-up type carrying a canopy structure 10. The canopy 10 has a side window 9 and a rear door 11 all arranged in conventional fashion. Positioned atop the canopy 10 is a framework comprising side rails 20 and 21, carrying transversly positioned rear roller 12 and front roller 14, both mounted for rotation. Depending from side rails 20 and 21 of the frame are canopy engaging mounting brackets 24. Mounting brackets 24 are constructed and arranged to provide engagement with a structural member of the canopy 10, thus holding side frame rail 20 and 21 rigidly upon the top of the canopy 10. Alternatively mounting brackets 24 may be formed to engage and lock upon the rain gutters of sedan or station wagon type vehicles in a well known fashion.

A pair of substantially parallel disposed running lines 16 and 18 are wrapped about rear roller 12 several times and exit from beneath rear roller 12 toward the front of the canopy 10. This structure is best seen in FIG. 1. Running lines 16 and 18 pass beneath front roller 14 and are bent about front roller 14 to pass rearwardly toward and over rear roller 12. By this construction a winding mehanism much like a winch is provided by rear roller 12 for winding in and playing out running lines 16 and 18. In addition, bending lines 16 and 18 about front roller 14 as shown induces rotative motion by front roller 14, as lines 16 and 18 run in and out as is further described below. If desired lines 16 and 18 may have one or more wraps around roller 14 to insure rotative motion thereof. Rear roller 12 is driven by a chain or belt drive mechanism. In the embodiment shown in FIG. 2, chain 26 passes about sprockets 27 and 29, sprocket 27 being mounted upon roller 12 for rotation therewith. Sprocket 29 is mounted for rotation on axle 31 rotatively positioned at the side of canopy 10. Axle 31 carries crank arm 28 for manually imparting rotative motion to axle 31 and thereby rotatively driving rear roller 12 throught chain 26 and sprocket 27. As is well known in the art, a reversible electrical motor drive may be used to operate roller 12.

Rollers 12 and 14 are each equipped with guide flanges 13 to prevent the boat from falling from the top of the vehicle in the unlikely event that it should become adjacent the ends of the rollers.

Depending on the extent to which rear bumper 30 extends rearwardly of the vehicle and depending upon the height above the ground of the rear bumper 30 it may be necessary to utilize a loading bumper mechanism 32. This device is shown abutting the rear bumper 30 and merely provides engagement for the transom for the boat during loading and unloading and is conveniently transported inside the vehicle when not in use.

When the boat to be loaded is positioned behind the vehicle as shown in FIG. 2, the running lines 16 and 18 are are extended rearwardly of the vehicle to a loading location. Lines 16 and 18 are each fixed to an eye 35 which in turn carries forward straddle line 34 and rear straddle line 36. Straddle lines 34 and 36 are each provided with quickly detachable terminal fitting for engagement with lifting locations on boat 40.

Adjacent the gunwales 38 of boat 40 are rearward lifting locations 44 and forward lifting locations 46. These lifting locations may be in the form of a eye bolt or other suitable lifting structure which may be quickly engaged by the terminal fitting mechanism attached to each end of the forward and rear straddle lines 34 and 36. Identical installation is provided on each gunwale of the boat for engagement by the substantially parallel disposed running lines. Lifting locations 44 and 46 are chosen so that straddle line 36 will engage rear roller 12 at or near the mid point of line 36 when boat 40 is rotated into a vertical position. Stated in another way lifting locations 44 and 46 are positioned on or near the gunwales, the distance from the transom 42 of boat 40 to lifting location 44 being less than the height of roller 12 from the ground and so that forward lifting location 46 is positioned with eye 35 above roller 12 when boat 40 is in a vertical orientation with its transom on the ground adjacent the rear bumper of the vehicle.

The sequence of events in loading boat 40 is shown in FIGS. 3 through 8. FIG. 3 shows boat 40 positioned on the ground with its transom rearwardly adjacent the vehicle carrying canopy 10. Preferably transom 42 abuts or nearly abuts loading bumper 32. Line 18 passes over the top of rear roller 12 and extends downwardly to eye 35. Forward straddle line 34 extends to and engages lifting location 46 and rear straddle line 36 extends to, and engages, lifting location 44. After securing front and rear straddle lines to their respective lifting locations, lines 16 and 18 are drawn taut by rotation of rear roller 12 in a counterclockwise direction, as viewed in FIGS. 3 through 8. Continued rotation of rear roller 12 causes boat 44 to rotate upwardly into the position shown in FIG. 4.

As lines 16 and 18 continue running inwardly and boat 44 continues to rotate about its transom 42, eye 35 assumes a position above roller 12, as best seen in FIG. 5. When boat 40 is substantially vertical rear straddle line 36 engages rear roller 12 and as lines 16 and 18 continue to be run in, a vertical force, denoted by arrow A in FIG. 6, begins to be applied to the boat at a substantial mechanical advantage due to bending of line 36 about roller 12. This upwardly directed force causes the boat to slowly ascend from the ground as shown. Arrow B demonstrates the other force component applied to boat 40 at this position tending to rotate boat 40 about roller 12. As lines 16 and 18 are drawn further a continued lift is applied to boat 40 raising its transom from ground surface and rotating boat 40 about roller 12. This rotation and forward travel of the boat on roller 12 continues until boat 40 is supported by both rear roller 12 and front roller 14. Boat 40 is then rolled forward on rollers 12 and 14 to a locked position shown, in outline, in FIG. 8. Any convenient means, well known in the art for securing the boat to frame rails 20 and 21 or to rollers 12 and 14 may be used.

To remove the boat from the top of canopy 10, the series of steps discussed above is substantially reversed. Roller 12 is rotated in a clockwise direction as seen in FIGS. 3 through 8. This rotation causes boat 40, which is resting upon the top of rollers 12 and 14 to translate rearwardly toward the position shown in FIG. 8. At that point, the center of gravity of the boat is positioned above roller 12 and it begins to rotate about roller 12, all the while being under control of the running lines 16 and 18. Since lines 16 and 18 are bent around roller 14, it is also caused to rotate, thus urging the boat rearwardly. Continued playing out of lines 16 and 18 by rotation of roller 12 causes boat 40 to rotate about roller 12 and descend under restraint of forward straddle line 34 as is shown best in FIGS. 8 and 7. Boat 40 continues its descent until transom 42 engages the ground, at which time continued playing out of lines 16 and 18 permit boat 40 to rotate about its transom to the ground engaging position shown in FIG. 3.

This invention thus provides a means for loading and unloading a boat by the single operative function of rotation of the rearwardly located roller 12 which acts as a winch and drive mechanism for running lines 16 and 18. Running lines 16 and 18 being trained about a forward roller 14 both act as the main lifting lines for the invention as well as the driving mechanism for rotation of roller 14. The location of the lifting attachment to boat provides a unique mechanical advantage in the initial vertical lifting of the boat when the boat is raised to the vertical position at the rear of the associated vehicle.

This invention has been described by way of discussion and certain drawings of the inventor's preferred embodiment. The foregoing is considered as illustrative only of the principles of the invention. Numerous modifications and changes will readily occur to those skilled in the art and accordingly all suitable modifications and equivalents thereof are intended to be within the scope and spirit of this invention subject to the scope of the claims set forth below.

I claim:

1. A boat loading and unloading mechanism for elevating a boat to the top carrying position on a vehicle comprising:
   (a) a load supporting frame means for carrying a load above a vehicle, said frame means including transversely positioned support elements, at least one of said support elements being a rotatively mounted roller means;
   (b) first and second running lines wrapped about said roller means exiting forwardly from the bottom thereof, said lines being trained about a forwardly positioned support element and extending rearwardly therefrom across the top of said roller means, each of said running lines having a straddle rigging means at the end thereof for straddle attachment to forwardly and rearwardly located lifting locations positioned adjacent a respective gunwale of a boat, said rearwardly positioned lifting location on each gunwale being positioned forwardly of the transom of said boat a distance less than the height of said roller means from the ground surface upon which the vehicle is positioned, said forwardly positioned lifting location being positioned forwardly of the transom a distance exceeding the height of said roller above said ground surface; whereby rotation of said boat into a position with the transom thereof on the ground causes said straddle rigging means to engage said roller.

2. The apparatus of claim 1 wherein said forwardly positioned support element is a rotatively mounted roller means.

3. The apparatus of claim 1 and transom engaging bumper means positioned rearwardly adjacent said vehicle to engage the transom of said boat during initial upward rotation thereof during loading.

4. The apparatus of claim 1 wherein said straddle rigging means each are comprised of a forward and rear straddle line, each straddle line connected at one end to said running line and at the other end having a terminal fitting adapted to releasably engage a complimentary fitting positioned at said lifting locations.

5. A boat loading mechanism for raising and lowering a boat to and from an upside-down stored position on a framework having a front, a rear and sides, said framework positioned and supported substantially horizontally above a support surface, said mechanism comprising:
   (a) a first roller means mounted and supported for rotation upon said framework, said roller means positioned transversely upon said framework and adjacent said rear of said framework;
   (b) at least one additional transversely positioned support member carried by said framework for supporting a boat thereon;
   (c) running line means adapted to extend from said front of said framework over said first roller means to a boat engaging position, said running line means including straddle attachment means for attachment at front and rear attachment points near the gunwale of said boat, the distance from said transom to said rear attachment points being less than the distance from said support surface to said roller and the distance from said transom to said front attachment points being greater than the distance from said support surface to said roller whereby, upon raising the boat, the rear run of said straddle attachment means engages and bends about said first roller means, thereby inducing vertical movement of said boat at a substantial mechanical advantage while inducing rotation of said boat about said first roller means onto said framework.

6. The apparatus of claim 5 wherein the frame is operatively associated with a subjacent vehicle.

7. The apparatus of claim 5 wherein said running line means comprises a pair of substantially parallel running line.

8. The apparatus of claim 5 wherein said running line means is wrapped about said roller a plurality of full turns and exits therefrom at the bottom of said roller, extending forwardly to and bending about said additional support member, thence traversing the top of said roller to a boat engaging position.

9. The apparatus of claim 5 or 8 wherein said additional support member is a roller mounted for rotation in said framework about an axis substantially parallel to said first roller means.

* * * * *